(12) United States Patent
Ruemmler et al.

(10) Patent No.: US 7,426,728 B2
(45) Date of Patent: Sep. 16, 2008

(54) REDUCING LATENCY, WHEN ACCESSING TASK PRIORITY LEVELS

(75) Inventors: Christopher Philip Ruemmler, Morgan Hill, CA (US); Jonathan K. Ross, Woodinville, WA (US)

(73) Assignee: Hewlett-Packard Development, L.P., Houston, TX (US)

( * ) Notice: Subject to any disclaimer, the term of this patent is extended or adjusted under 35 U.S.C. 154(b) by 915 days.

(21) Appl. No.: 10/670,026

(22) Filed: Sep. 24, 2003

(65) Prior Publication Data

US 2005/0066096 A1   Mar. 24, 2005

(51) Int. Cl.
G06F 9/46 (2006.01)
G06F 3/00 (2006.01)
G06F 13/24 (2006.01)
G06F 13/26 (2006.01)

(52) U.S. Cl. .............. 718/100; 718/102; 718/103; 710/49; 710/260; 710/262; 710/264; 710/266

(58) Field of Classification Search ............ 718/100, 718/101, 102, 103, 104, 105, 106, 107; 710/48, 710/49, 260, 262, 264, 261, 263, 266, 267
See application file for complete search history.

(56) References Cited

U.S. PATENT DOCUMENTS

| | | | | |
|---|---|---|---|---|
| 5,191,649 A * | 3/1993 | Cadambi et al. | ............ | 709/225 |
| 5,282,272 A * | 1/1994 | Guy et al. | ............ | 710/116 |
| 5,410,710 A * | 4/1995 | Sarangdhar et al. | ......... | 710/266 |
| 5,555,420 A * | 9/1996 | Sarangdhar et al. | ......... | 710/266 |
| 6,006,301 A | 12/1999 | Tetrick | | |
| 6,021,458 A | 2/2000 | Jayakumar et al. | | |
| 6,061,709 A * | 5/2000 | Bronte | ......... | 718/103 |
| 6,115,778 A * | 9/2000 | Miyake et al. | ............ | 710/260 |
| 6,192,442 B1 | 2/2001 | Haren et al. | | |
| 6,219,741 B1 | 4/2001 | Pawlowski et al. | | |
| 6,295,574 B1 * | 9/2001 | MacDonald | ............. | 710/261 |
| 6,298,410 B1 | 10/2001 | Jayakumar et al. | | |
| 6,418,496 B2 | 7/2002 | Pawlowski et al. | | |
| 6,665,750 B1 * | 12/2003 | Williams et al. | ............ | 710/48 |
| 6,799,269 B2 * | 9/2004 | Dowling | .............. | 712/244 |
| 7,080,205 B2 * | 7/2006 | Demharter | ............. | 711/119 |

OTHER PUBLICATIONS

Reed Hellman, The Future of the OS for Internet Applications, IEEE, Computer vol. 33 Issue 5 May 2000.*
Intel Itanium Processor Family Interrupt Architecture Guide, Mar. 2003 (42 sheets).

* cited by examiner

*Primary Examiner*—Meng-Ai An
*Assistant Examiner*—Abdullah Al Kawsar

(57) ABSTRACT

One embodiment disclosed relates to a method of reducing access latency to a task priority register (TPR) of a local programmable interrupt controller unit within a microprocessor. A command is received to write an interrupt mask value to the TPR, and the interrupt mask value is written to the TPR. In addition, the interrupt mask value is also written into a shadow copy of the TPR. The shadow copy is written each time that the TPR is written. Another embodiment disclosed relates to a method of reducing a latency to read a TPR of an IPF type microprocessor. When a command is received to read an interrupt mask value from the TPR, the interrupt mask value is read from the shadow copy at a memory location, instead of from the task priority register itself.

21 Claims, 7 Drawing Sheets

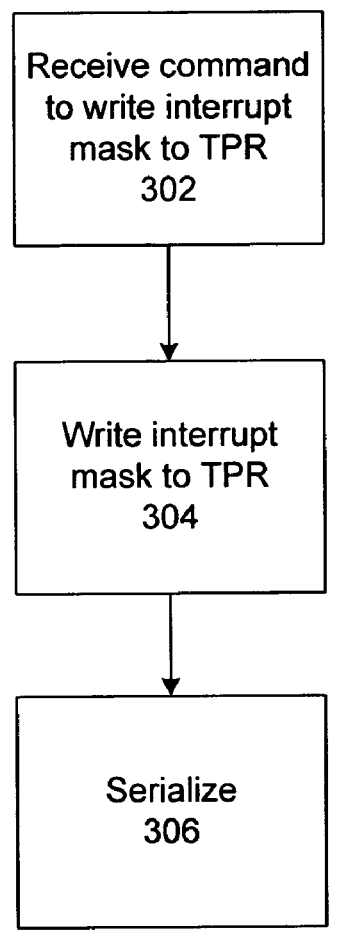
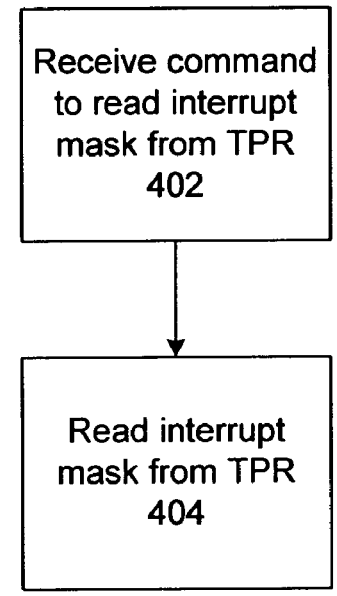
FIG. 3
(Background Art)
FIG. 4
(Background Art)

REDUCING LATENCY, WHEN ACCESSING TASK PRIORITY LEVELS

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates generally to microprocessors and operating systems.

2. Description of the Background Art

In general, when a central processing unit (CPU) of a computer system receives an interrupt, the CPU suspends its current operations, saves the status of its work, and transfers control to a special routine that contains the instructions for dealing with the particular situation that caused the interrupt. Interrupts might be generated by various hardware devices to request service or to report problems, or by the CPU itself in response to program errors or requests for operating system services. Interrupts are the CPU's way of communicating with the other elements that make up the computer system. A hierarchy of interrupt priorities determines which interrupt request will be handled first, if more than one request has been made. Particular programs can temporarily disable some interrupts, when the program needs the full attention of the processor to complete a particular task.

An interrupt can be considered a feature of a computer that permits the execution of one program to be interrupted in order to execute another program. That other program might be a special program that is executed when a specific interrupt occurs, sometimes called an interrupt handler. Interrupts from different causes have different handlers to carry out the corresponding tasks, such as updating the system clock or reading the keyboard. A table stored in memory contains pointers, sometimes called address vectors, which direct the CPU to the various interrupt handlers. Programmers can create interrupt handlers to replace or supplement existing handlers. Alternatively, that other program might be one that takes place only when requested by means of an interrupt, sometimes called an interrupt-driven process. After the required task has been completed, the CPU is then free to perform other tasks until the next interrupt occurs. Interrupt driven processors sometimes are used to respond to such events as a floppy-disk drive having become ready to transfer data.

Computers typically include a hardware line, sometimes called an interrupt request line, over which devices such as a keyboard or a disk drive can send interrupts to the CPU. Such interrupt request lines are built into the computer's internal hardware, and are assigned different levels of priority so that the CPU can determine the sources and relative importance of incoming service requests. The manner in which a particular computer deals with interrupts, is determined by the computer's interrupt controller. Early interrupt controllers were hard-wired in the computer. As such, their operation was fixed by the computer manufacturer, and could not be altered. More recent interrupt controllers are typically programmable.

In certain microprocessors manufactured by Intel Corporation of Santa Clara, Calif., an advanced programmable interrupt controller (APIC) is included in the CPU. The recently introduced Itanium™ microprocessor, also manufactured by Intel Corporation, is a CPU under the Intel IPF processor architecture. The IPF architecture includes a streamlined advanced programmable interrupt controller (SAPIC). Both the APIC and the SAPIC include a local mask register called a task priority register (TPR) that has eight bits to designate up to 256 priority states, although some of them are reserved. The data in the TPR is changed to reflect the level of priority of the tasks being performed by the processor.

FIG. 1 illustrates a schematic diagram of an example computer system implementing a SAPIC interrupt routing scheme. The computer system 100 may include a single processor 101, as shown, or a plurality of processors. The processor 101 may be, for example, a CPU from Intel Corporation, such as one with the Intel IPF processor architecture. The processor 101 is coupled to a bus 110 that transmits data signals between the processor 101 and other components in the computer system 100.

The memory 113 may comprise a dynamic random access memory (DRAM) device, a static random access memory (SRAM) device, and/or other memory devices. The memory 113 stores data signals that may be executed by the processor 101. A bridge memory controller 111 is coupled to the bus 110 and the memory 113. The bridge memory controller 111 directs data traffic between the processor 101, the memory 113, and other components in the computer system 100 and bridges signals from these components to a high-speed input/output (I/O) bus 120.

The computer system 100 includes a bus bridge 123 configured to deliver interrupts using the SAPIC interrupt delivery scheme. The bus bridge 123 is connected to the peripheral devices on the I/O bus 130 via a plurality of interrupt request ("IRQ") lines 163-165. A first IRQ line 163 connects the bus bridge 123 with the data storage device 131. A second IRQ line 164 connects the bus bridge 123 with the keyboard interface 132. A third IRQ line 165 connects the bus bridge 123 with the audio controller. When a peripheral on the I/O bus 130 requires the processor 101 to perform a service, the peripheral device transmits an interrupt request to the bus bridge 123 by asserting its corresponding IRQ line. The bus bridge 123 forwards the interrupt to the interrupt router 140 coupled to the high speed I/O bus 120 via one of the plurality of IRQ lines 154. The interrupt router 140 reformats the interrupt into an interrupt message and transmits the interrupt message over the high speed I/O bus 120. Interrupt messages are transmitted as posted memory writes from the high speed I/O bus 120 to the CPU bus 110.

The interrupt router is connected to peripherals on the high speed I/O bus 120 via a plurality of Peripheral Component Interconnect interrupt request lines ("PIRQ") 161-162. A first PIRQ line 161 connects the network controller 121 to the interrupt router 140. A second PIRQ line 162 connects the display device controller 122 to the interrupt router 140. When a peripheral on the high speed I/O bus 120 requires the processor 101 to perform a service, the peripheral device transmits an interrupt request to the interrupt router 140 by asserting its corresponding PIRQ line. The interrupt router 140 reformats the interrupt into an interrupt message and transmits the interrupt message over the high speed I/O bus 120. Interrupt messages are transmitted as posted memory writes from the high speed I/O bus 120 to the CPU bus 110.

FIG. 2 is a flow diagram depicting a logical process where a task priority register (TPR) is utilized under the SAPIC architecture of an Intel IPF processor. The flow diagram is entered via the line 210 in response to an Interrupt Vector Register (IVR) being read. The first illustrated control action is determining whether a non-maskable interrupt is present (the decision block 220). If a non-maskable interrupt is present, it is returned in the IVR (the process block 230).

If, on the other hand, a non-maskable interrupt is not present, then the decision block 240 is entered. The decision is made whether the TPR has disabled the interrupts present, or, whether the Highest Pending Interrupt (HPI) is less than, or equal to, the Highest Servicing Interrupt (HSI). If the result of the decision block 240 is yes, then the spurious vector is returned in the IVR (process block 250). For example, in one implementation, a specific vector number is reserved to indicate a spurious vector. With respect to decision block 240, note that HPI might equal HSI because, in operation, an interrupt source might send an interrupt to the controller while the controller is in the process of service an interrupt previously received from that device, or more than one interrupt source might be programmed with the same interrupt vector.

If the outcome of the decision block 240 is no, that is, if TPR has not disabled the interrupts present and HPI is greater than HSI, then the Interrupt Service Register (ISR) bit corresponding to the highest priority interrupt, which in one implementation is the top-most vector in the Interrupt Request Register (IRR), is set. In addition, the IRR bit corresponding to the highest priority interrupt is cleared. Also, the top-most vector (the vector for the highest priority interrupt) in the IRR is returned in the IVR.

SUMMARY

One embodiment of the invention relates to a method of reducing access latency to a task priority register (TPR) of a local programmable interrupt controller unit within a microprocessor. A command is received to Write an interrupt mask value to the TPR, and the interrupt mask value is written to the TPR. In addition, the interrupt mask value is also written into a shadow copy of the TPR. The shadow copy is written each time that the TPR is written.

Another embodiment of the invention relates to a method of reducing a latency to read a TPR of an IPF type microprocessor. When a command is received to read an interrupt mask value from the TPR, the interrupt mask value is read from the shadow copy at a memory location, instead of from the task priority register itself.

Another embodiment of the invention relates to an operating system with reduced access latency to a task priority register of a local programmable interrupt controller unit within a microprocessor. Microprocessor-executable code is configured to write a priority level to the task priority register. In addition, microprocessor-executable code is also configured to write the priority level into a shadow copy of the task priority register. The shadow copy is written each time that the task priority register is written.

Another embodiment of the invention relates to an operating system with reduced latency to read a task priority register of a local programmable interrupt controller unit within a microprocessor. Microprocessor-executable code is configured read the interrupt mask value from the shadow copy at a memory location, instead of from the task priority register itself.

Another embodiment of the invention relates to a multiple-processor computer system. Multiple microprocessors are interconnected by a processor bus. Each microprocessor includes a task priority register (TPR) with a interrupt mask value for that microprocessor. A memory system, including local cache memory on each microprocessor and a main memory, holds data including an operating system and shadow copies of the TPRs. The operating system includes executable-code for reading the interrupt mask values from the shadow copies and for maintaining the shadow copies.

Another embodiment of the invention relates to a method of reducing latency to write a task priority register within a microprocessor. Upon receiving a command to write an interrupt mask value to the task priority register, the interrupt mask value is written to the task priority register without performing a serialization directly thereafter. Upon receiving an interrupt, the serialization and reading an interrupt vector register are performed, wherein a spurious indicator is returned if the interrupt is maskable.

BRIEF DESCRIPTION OF THE DRAWINGS

FIG. 3 is a flow diagram depicting a conventional method of writing a priority level to the TPR of an IPF type processor.

FIG. 4 is a flow diagram depicting a conventional method of reading a priority level from the TPR of an IPF type processor.

DETAILED DESCRIPTION

Figure 1:
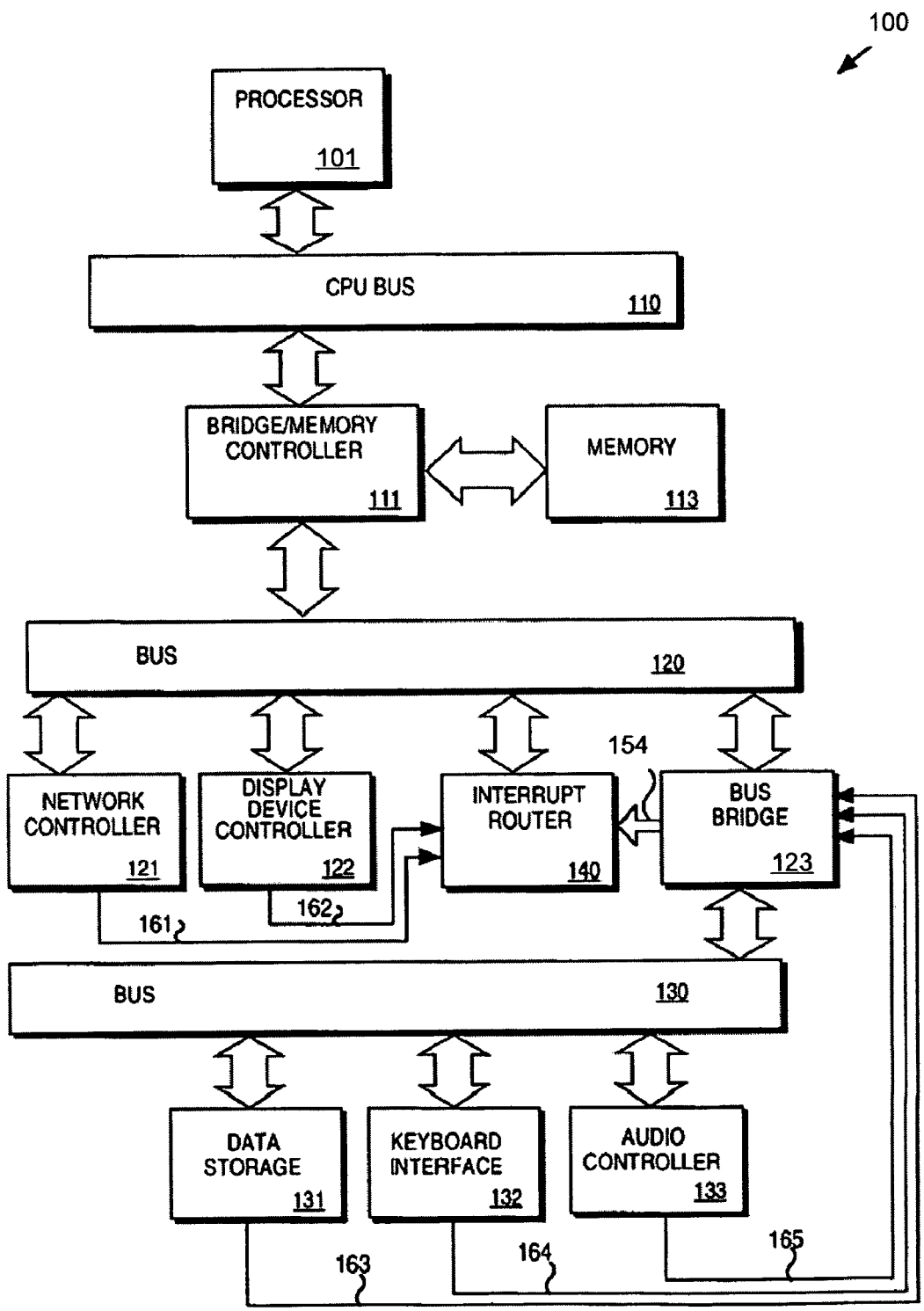
FIG. 1 illustrates a schematic diagram of an example computer system implementing a streamlined advanced programmable interrupt controller (SAPIC) interrupt routing scheme.
Figure 2:
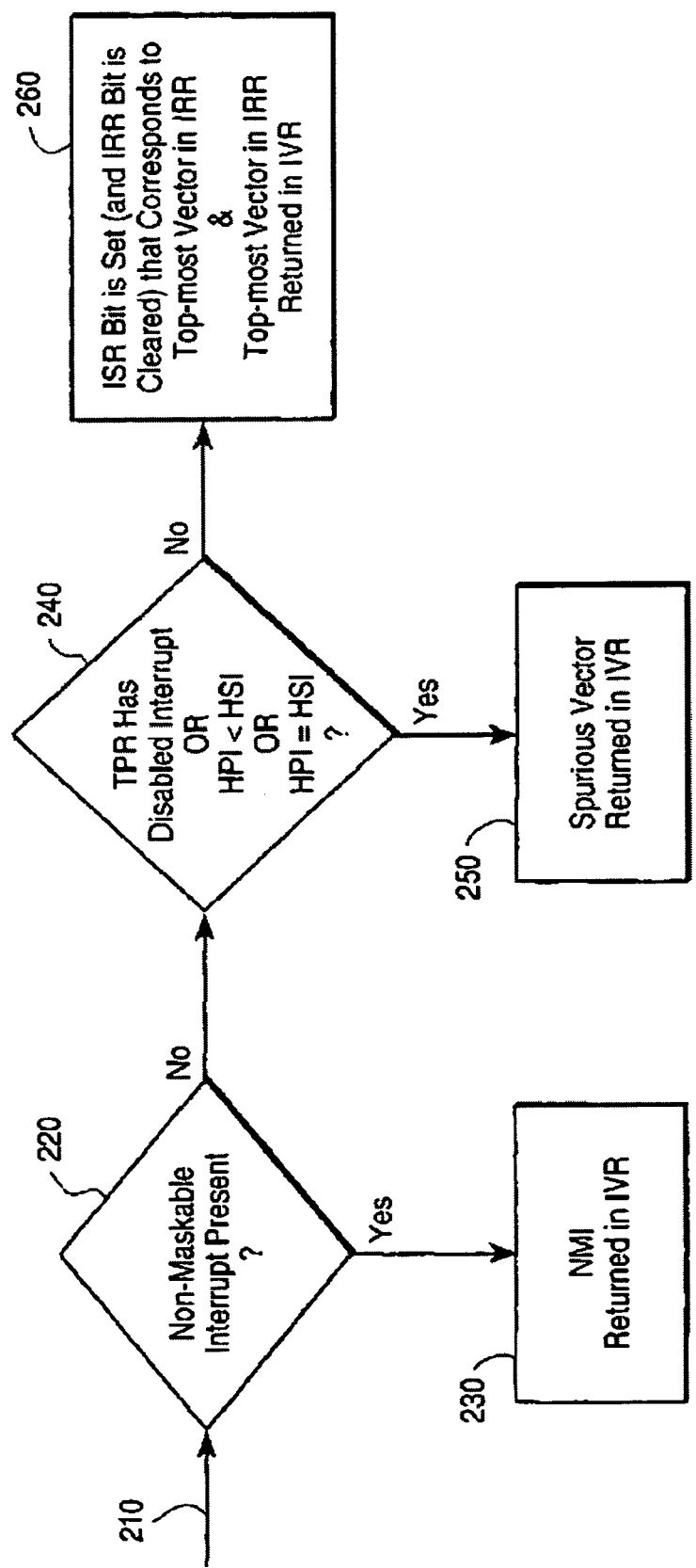
FIG. 2 is a flow diagram depicting a logical process where a task priority register (TPR) is utilized under the SAPIC architecture.

As described below, one embodiment of the present invention relates to improving access to the task priority register (TPR) of an Intel IPF type processor. The TPR is useful in that, for example, nested interrupts may be implemented using it. For instance, using the TPR, a spin lock interrupt may be held, while letting a higher priority clock interrupt through.

FIG. 3 is a flow diagram depicting a conventional method of writing a priority level or interrupt mask value to the TPR of an IPF type processor. In accordance with the conventional method, when a command or instruction to write the interrupt mask to the TPR is received 302, then two actions are performed. First, the interrupt mask is written 304 to the TPR. Second, to make sure that the most recent modified state is "visible", a serialize operation or serialization is then performed 306. For example, the serialization may take the form of a "srlz.d" instruction in an IPF microprocessor. After the serialize instruction, the system is guaranteed to be in a consistent state such that reading values from registers will make sense. This is needed because multiple writes may be outstanding at one time to control registers in an IPF microprocessor.

FIG. 4 is a flow diagram depicting a conventional method of reading a priority level or interrupt mask value from the TPR of an IPF type processor. In accordance with the conventional method, when a command or instruction to read the interrupt mask from the TPR is received 402, then the interrupt mask is read 404 from the the actual task priority register in the microprocessor.

The above-described conventional methods for writing and reading an interrupt mask value from the TPR under the SAPIC architecture of an Intel IPF processor work in that undesirable indeterminate states are avoided. However, applicants have discovered that these conventional methods typically resulted in thirty-six (36) cycle latencies to read or serialize the write of the TPR in an IPF processor. Such a lengthy latency to access the TPR is substantially disadvantageous, especially when the TPR is frequently written to and/or read from.

Figures 5, 6:
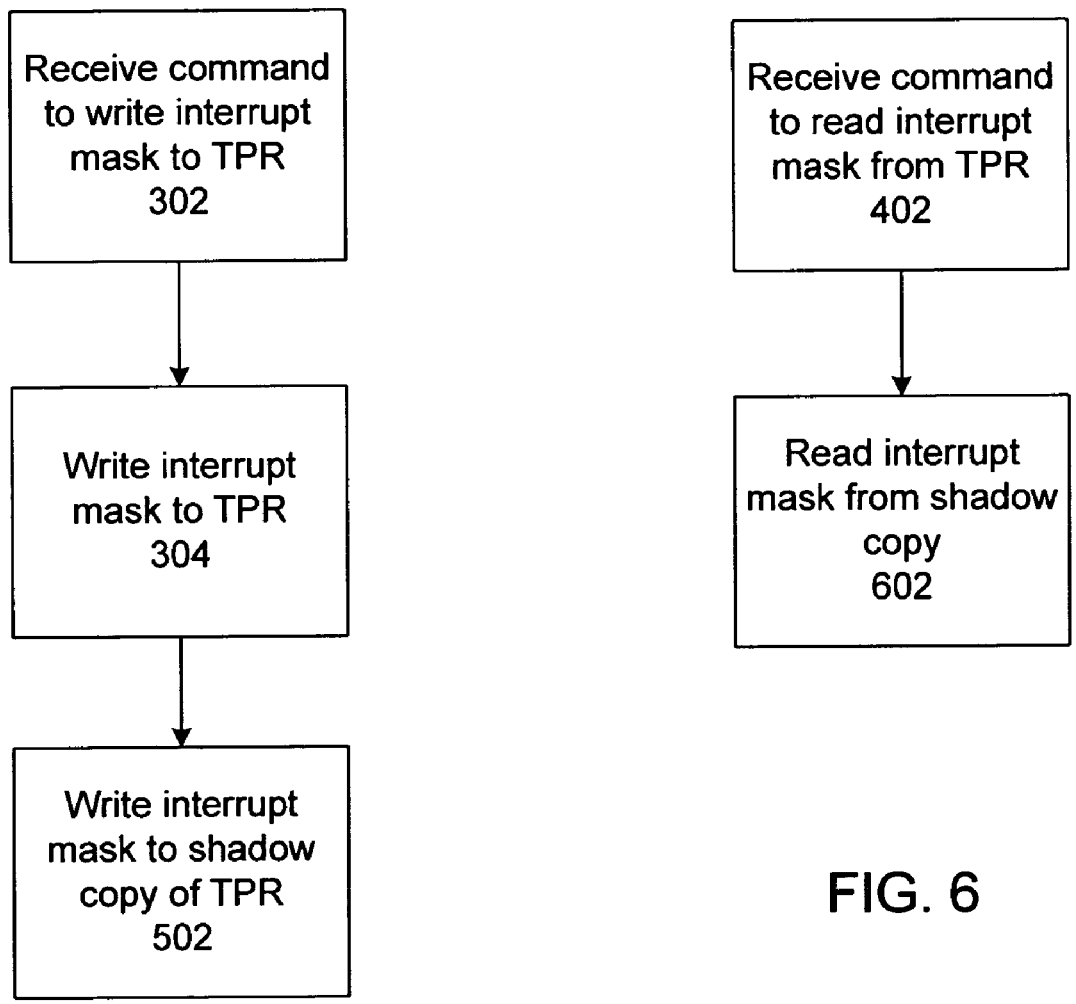
FIG. 5 is a flow diagram depicting a conventional method of processing an interrupt of an IPF type processor.
FIG. 6 is a flow diagram depicting a method of writing a priority level to the TPR of an IPF type processor in accordance with an embodiment of the invention.

FIG. 5 is a flow diagram depicting a method of writing a priority level or interrupt mask value to the TPR of an IPF type processor in accordance with an embodiment of the invention. When a command or instruction to write the interrupt mask to the TPR is received 302, then two actions are performed. The first action is the same as in the conventional method, the interrupt mask is written 304 to the actual task priority register. However, the second action differs substantially. Here, the second action comprises writing 502 the same interrupt mask to a shadow copy of the TPR. The shadow copy is kept at a specific memory location.

In contrast with the conventional method of FIG. 3, no serialization is performed. Because no serialization is performed and because the serialization is the primary source of the long latency of the conventional method, applicants have discovered that the latency to write the TPR is reduced substantially using the method of FIG. 5.

The method of FIG. 5 is faster because it is a "lazy" method in that writing the TPR is not immediately followed by serialization. Normally, it would be expected that this "lazy" method would result, in some circumstances, in the occurrence of an invalid or indeterminate processor state. Fortunately, in accordance with an embodiment of the invention, such undesirable states are nonetheless avoidable as discussed further below.

FIG. 6 is a flow diagram depicting a method of reading a priority level or interrupt mask value from the TPR of an IPF type processor in accordance with an embodiment of the invention. When a command or instruction to read the interrupt mask from the TPR is received 302, then the value is simply read 602 from the shadow copy of the TPR. The actual TPR is not accessed, instead the shadow copy is read.

In contrast, the conventional method of FIG. 4 reads the interrupt mask by accessing the actual TPR. Applicants have discovered that the latency to perform the read is reduced substantially by reading from the shadow copy, instead of accessing the actual TPR. If reads of the interrupt mask occur with sufficient frequency, then the memory location of the shadow copy will be in local cache memory on the microprocessor, instead of in main memory. If, for example, the shadow copy is located in the first level cache, then only a single cycle would be needed to access the value therein, as opposed to the 36 cycle latency of the conventional method.

Figure 7:
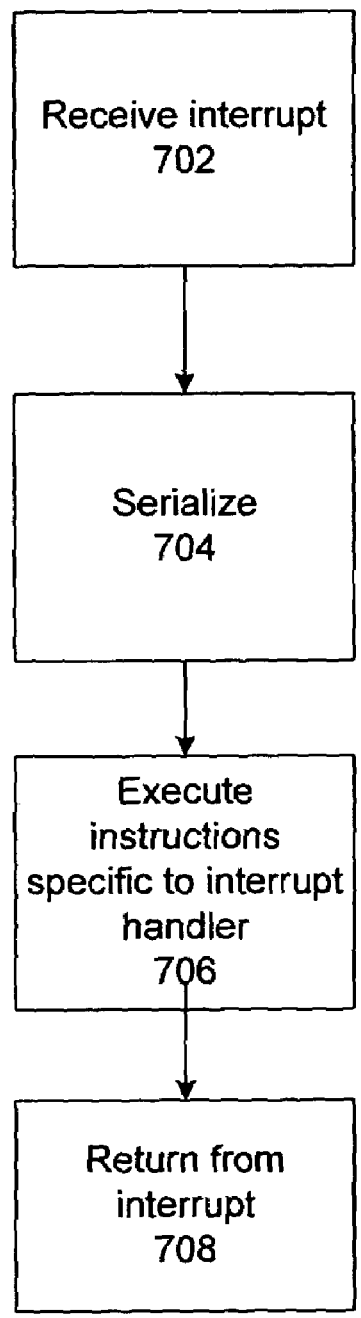
FIG. 7 is a flow diagram depicting a method of reading a priority level to the TPR of an IPF-type processor in accordance with an embodiment of the invention.

FIG. 7 is a flow diagram depicting a conventional method of processing an interrupt by an IPF type processor. When an interrupt is received 702, a serialize operation is performed 704. Instructions specific to the interrupt handler are then executed 706. Thereafter, the processing returns 708 from the interrupt.

Figure 8:
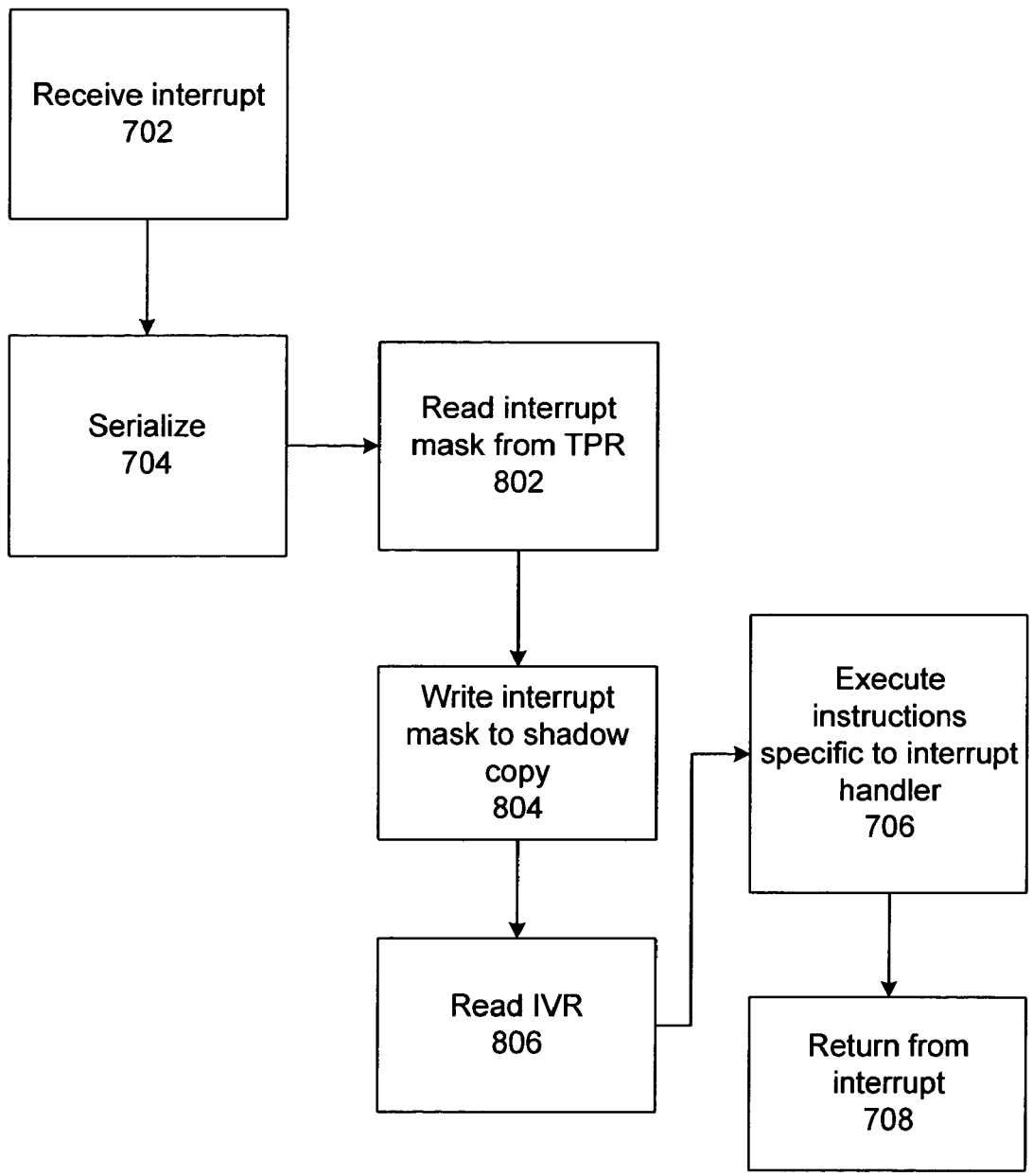
FIG. 8 is a flow diagram depicting a method of processing an interrupt of an IPF type processor in accordance with an embodiment of the invention.

FIG. 8 is a flow diagram depicting a method of processing an interrupt by an IPF type processor in accordance with an embodiment of the invention. Similar to the conventional method, when an interrupt is received 702, a serialize operation is performed 704. Here, this serialization 704 is advantageously utilized to avoid potential problems that may otherwise occur due to the "lazy" write method of FIG. 5.

In addition, to ensure that the shadow copy of the interrupt mask is kept in synchronization with the task priority register contents, two additional steps are performed when initially starting the interrupt. First, the interrupt mask is read 802 from the task priority register. Second, the value that was just read is written 804 to the shadow copy of the TPR. This advantageously keeps the shadow copy up-to-date and avoids potential problems due to the case where an interrupt occurs after the task priority register is written 304 but before the shadow copy is written 502.

In addition, the IVR may be read 806 by a first level interrupt handler to effectively block delivery of interrupts that may have arrived when the "in-flight" (not yet serialized) write of the interrupt mask would have masked the interrupt (but did not). Software expects that after raising the interrupt level, no such maskable interrupts will be delivered. The above-described "lazy" management of the processor resources by skipping serialization after TPR writes must still preserve the conventional behavior—in this case, blocking the delivery of maskable interrupts. The desired "blocked-interrupt" behavior may be achieved by reading 806 the IVR at the beginning of the first level interrupt handler. Since the TPR was serialized 704 prior to the read 806, a "spurious" value is read from the IVR if the interrupt is maskable. Upon receipt of such a "spurious" indicator, the first level interrupt handler may return to the interrupted context. The interrupt so aborted will remain pending in the processor to be harvested by software or to cause another interrupt process when the interrupt level is lowered.

Thereafter, instructions specific to the interrupt handler are then executed 706, and the processing returns 708 from the interrupt.

In accordance with an embodiment of the invention, substantial performance improvement is achieved by the above because each TPR write can skip an expensive (performance wise) serialization. The number of TPR writes is typically greater by orders of magnitude than the arrival rate of interrupts, and only a fraction fo interrupts will arrive in the window between a TPR write and when that write is actually visible to hardware. Hence, the small number of spurious interrupts is much less of a performance penalty than the gain achieved by skipping large numbers of serializations. Note that this "lazy" serialization of TPR writes does not require using a shadow copy of the TPR. The lazy serialization of the TPR write may be performed by skipping the serialization of the TPR write and doing the serialization and IVR read in the first level interrupt handler.

Figure 9:
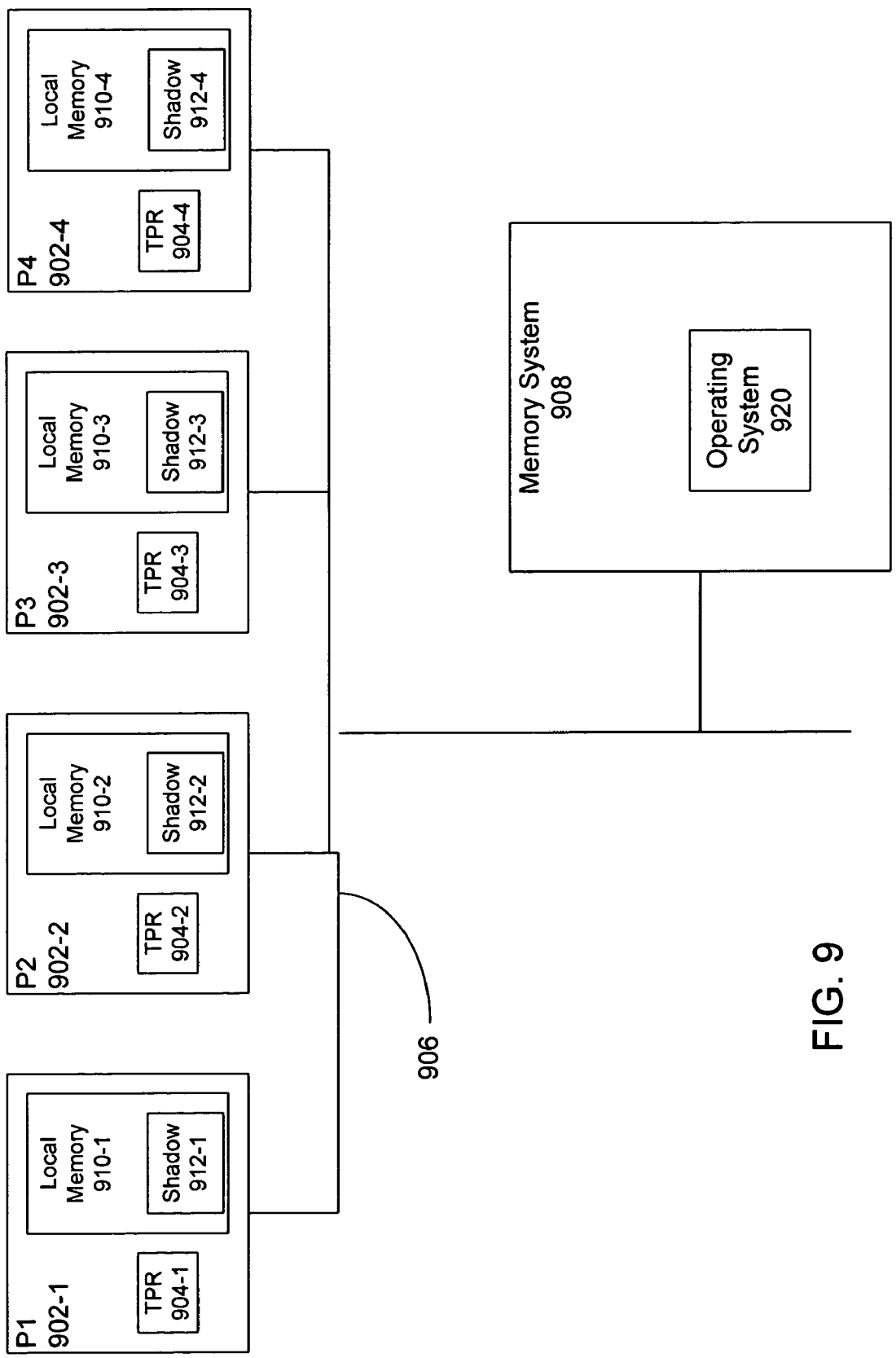
FIG. 9 is a schematic diagram of a multiple processor computer system in accordance with an embodiment of the invention.

FIG. 9 is a schematic diagram of a multiple processor computer system in accordance with an embodiment of the invention. In FIG. 9, the multiple processor computer includes four microprocessors (P1 through P4), but other numbers of microprocessors may be included in other embodiments. Each microprocessor PN 902-N, includes a task priority register 904-N and local cache memory 910-N. The local memory 910-N may include a shadow copy 912-N of the local TPR. A shadow copy would be in the local memory if the local interrupt mask is being accessed with sufficient frequency. Otherwise, the shadow copy may be stored in a location in main memory.

In addition, a microprocessor or CPU bus 906 may interconnect the microprocessors 902. A memory system 908 is also accessible by the microprocessor 904. The memory system 908 may include a main memory, the local memories 910 in the processors, and other memory devices (hard disks and so on). An operating system 920 is stored in the memory system 908. The operating system 908 may include executable-code for reading the interrupt mask values from the shadow copies and for maintaining the shadow copies, as described in further detail above.

The following is example source code that may be utilized in a routine within the operating system accordance with an embodiment of the invention. The code includes macros of instructions for setting and retrieving the task priority levels utilizing a shadow copy of the TPR.

```
/*
 * BEGIN_DESC
 *
 * File:
 *    @(#)        em/h/int_mask.h
 *
 * Purpose:
 *    This file contains macros for setting and retrieving the system
 *    interrupt mask.
 *
 * Classification:
 *    kernel private
 *
 *
 *
 *
 *
 * NOTE:
 *    This header file contains information specific to the internals
 *    of the HP-UX implementation. The contents of this header file
 *    are subject to change without notice. Such changes may affect
 *    source code, object code, or binary compatibility between
 *    releases of HP-UX. Code which uses the symbols contained within
 *    this header file is inherently non-portable (even
 *    between HP-UX implementations)
 *
 * END_DESC
 */
#ifdef _NO_EM_HDRS
    EM header file -- do not include this header file for non-EM builds.
#endif
#ifndef _MACHINE_H_INT_MASK_INCLUDED
#define _MACHINE_H_INT_MASK_INCLUDED
#include <sys/types.h>
#include <sys/spinlock.h>
#include <machine/h/getppdp_kernprivate.h>
#include <machine/sync/spl.h>
#include <machine/sys/kern_inline.h>
#include <machine/sys/reg_struct.h>        /* For NAT_ALIGN */
/*
 * Read the interrupt mask level. Just read the shadow copy which will
 * be identical to the value in the TPR register.
 */
#define GET_INT_MASK(regx) \
    do { \
        uint64_t dummy;\
        regx = GETPPDP_ALIAS(dummy)->current_int_mask;\
    } while (0) ;
/*
 * Write the interrupt mask. No need to serialize given lazy TPR
 * writes. Also write the shadow TPR value.
 */
#define SET_INT_MASK(regx) \
    do { \
        uint64_t dummy;\
        u_long regx_l = (u_long) regx;\
        VASSERT ( ( spinlocks_held( ) ||\
            (spinlocks_held( ) && (regx_l >= SPLSYS)));\
        _MOV_TO_CR(CR_TPR, regx_l) ;\
        GETPPDP_ALIAS(dummy)->current_int_mask = regx_l;\
    } while(0) ;
#endif /* _MACHINE_H_INT_MASK_INCLUDED */
```

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of reducing access latency to a task priority register of a local programmable interrupt controller unit within a microprocessor, the method comprising:
   receiving a command to write an interrupt mask value to the task priority register;
   writing the interrupt mask value to the task priority register; and
   writing the interrupt mask value into a shadow copy of the task priority register, wherein the shadow copy is written at a memory location each time that the task priority register is written;
   receiving a command to read the interrupt mask value from the task priority register; and
   reading the interrupt mask value from the shadow copy, instead of from the task priority register,
   wherein the method obviates a need to use a serialize instruction after the task priority register is written because each interrupt performs a serialize operation and performs a read of an interrupt vector register to validate a current interrupt masking level.

2. The method of claim 1, wherein the shadow copy is always written after the task priority register is written.

3. The method of claim 2, further comprising, upon receiving an interrupt, reading the interrupt mask value from the task priority register and writing the interrupt mask value to the shadow copy.

4. The method of claim 1, wherein, if the task priority register is accessed frequently, then the shadow copy is stored in low-latency cache memory within the microprocessor.

5. The method of claim 1, whereby a latency of writing to the task priority register is substantially reduced.

6. The method of claim 1, whereby a latency of reading from the task priority register is substantially reduced.

7. The method of claim 1, wherein data in the task priority register reflects a level of priority of tasks being performed by the microprocessor.

8. The method of claim 7, wherein the task priority register comprises eight bits to designate up to 256 priority states.

9. The method of claim 1, wherein the method is performed by an operating system.

10. The method of claim 3, comprising, after writing the interrupt mask to the shadow copy, reading an interrupt vector register at a beginning of an interrupt handler.

11. The method of claim 10, further comprising executing instructions specific to the interrupt handler and returning from the interrupt handler.

12. A computer-readable medium storing an operating system with reduced access latency to a task priority register of a local programmable interrupt controller unit within a microprocessor, the computer-readable medium comprising:
- microprocessor-executable code configured to write a priority level to the task priority register; and
- microprocessor-executable code configured to write the priority level into a shadow copy of the task priority register, wherein the shadow copy is written at a memory location each time that the task priority register is written; and
- microprocessor-executable code configured to read the priority level from the shadow copy, instead of from the task priority register, wherein the operating system avoids a need to use a serialize instruction after the task priority register is written because each interrupt performs a serialize operation and performs a read of an interrupt vector register to validate a current interrupt masking level.

13. The computer-readable medium of claim 12, wherein the shadow copy is always written after the task priority register is written.

14. The computer-readable medium of claim 13, further comprising, microprocessor-executable code configured to, upon receipt of an interrupt, read the priority level from the task priority register and write the priority level to the shadow copy.

15. The computer-readable medium of claim 12, wherein, if the task priority register is accessed frequently, then the shadow copy is stored in low-latency cache memory within the microprocessor.

16. The computer-readable medium of claim 12, whereby a latency of writing to the task priority register is substantially reduced.

17. The computer-readable medium of claim 12, whereby a latency of reading from the task priority register is substantially reduced.

18. A method of reducing a latency to read a task priority register of a microprocessor, the method comprising:
- receiving a command to read an interrupt mask value from the task priority register; reading the interrupt mask value from a shadow copy at a memory location, instead of from the task priority register itself;
- receiving a command to write an interrupt mask value to the task priority register;
- writing the interrupt mask value to the task priority register; and
- writing the interrupt mask value into the shadow copy of the task priority register,
- wherein the method obviates a need to use a serialize instruction after the task priority register is written because each interrupt performs a serialize operation and performs a read of an interrupt vector register to validate a current interrupt masking level.

19. An operating system stored on a computer-readable medium with reduced latency to read a task priority register of a local programmable interrupt controller unit within a microprocessor, the operating system comprising microprocessor-executable code configured to:
- write the interrupt mask value into the task priority register and into a shadow copy of the task priority register; and
- read the interrupt mask value from the shadow copy at a memory location, instead of from the task priority register itself,
- wherein a need to use a serialize instruction after writing the task priority register is obviated because each interrupt performs a serialize operation and performs a read of an interrupt vector register to validate a current interrupt masking level.

20. A multiple-processor computer system comprising:
- a plurality of microprocessors interconnected by a processor bus, wherein each microprocessor includes a task priority register (TPR) with a interrupt mask value for that microprocessor;
- a memory system, including local cache memory on each microprocessor and a main memory, wherein the memory system holds data including an operating system and shadow copies of the TPRs,
- wherein the operating system includes executable-code for writing the interrupt mask value into the task priority register and into the shadow copies of the TPRs, for reading the interrupt mask values from the shadow copies and for maintaining the shadow copies, and
- wherein a need to use a serialize instruction after writing the task priority register is obviated because each interrupt performs a serialize operation and performs a read of an interrupt vector register to validate a current interrupt masking level.

21. A method of reducing latency to write a task priority register within a microprocessor, the method comprising:
- upon receiving a command to write an interrupt mask value to the task priority register, writing the interrupt mask value to the task priority register and into a shadow copy of the task priority register at a memory location without performing a serialization directly thereafter;
- upon receiving a command to read an interrupt mask value from the task priority register, reading the interrupt mask value from a shadow copy at a memory location, instead of from the task priority register itself; and
- upon receiving an interrupt, performing the serialization and reading an interrupt vector register, wherein a spurious indicator is returned if the interrupt is maskable,
- wherein a need to use a serialize instruction after writing the task priority register is obviated because each interrupt performs the serialization and performs the read of an interrupt vector register to validate a current interrupt masking level.

* * * * *

UNITED STATES PATENT AND TRADEMARK OFFICE
CERTIFICATE OF CORRECTION

PATENT NO. : 7,426,728 B2
APPLICATION NO. : 10/670026
DATED : September 16, 2008
INVENTOR(S) : Christopher Philip Ruemmler et al.

It is certified that error appears in the above-identified patent and that said Letters Patent is hereby corrected as shown below:

Title Pg, Item (54), in "Title", delete "LATENCY," and insert -- LATENCY --, therefor.

In column 1, line 1, delete "LATENCY," and insert -- LATENCY --, therefor.

Signed and Sealed this

Fourth Day of August, 2009

JOHN DOLL
*Acting Director of the United States Patent and Trademark Office*